US011062149B2

(12) United States Patent
Seko (10) Patent No.: US 11,062,149 B2
(45) Date of Patent: Jul. 13, 2021

(54) SYSTEM AND METHOD FOR RECORDING IMAGES REFLECTED FROM A VISOR (71) Applicant: Honda Motor Co., Ltd., Tokyo (JP)

(72) Inventor: Shigeyuki Seko, Campbell, CA (US)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 15/910,348

(22) Filed: Mar. 2, 2018

(65) Prior Publication Data
US 2019/0272432 A1 Sep. 5, 2019

(51) Int. Cl.
G06K 9/00 (2006.01)
B60Q 9/00 (2006.01)
B62J 99/00 (2020.01)
G06T 7/73 (2017.01)
H04N 5/225 (2006.01)
B62J 45/20 (2020.01)
B62J 45/40 (2020.01)
B62J 50/25 (2020.01)

(52) U.S. Cl.
CPC ........... G06K 9/00791 (2013.01); B60Q 9/00 (2013.01); B62J 99/00 (2013.01); G06T 7/73 (2017.01); B62J 45/20 (2020.02); B62J 45/40 (2020.02); B62J 50/25 (2020.02); H04N 5/2257 (2013.01)

(58) Field of Classification Search
CPC .............................. G06K 9/00791; G06T 7/73
See application file for complete search history.

(56) References Cited

U.S. PATENT DOCUMENTS

| 6,099,133 | A | * | 8/2000 | Wright | ................... | A45D 42/12 |
| | | | | | | 359/879 |
| 7,710,654 | B2 | | 5/2010 | Ashkenazi et al. | | |
| 7,738,678 | B2 | | 6/2010 | Breed et al. | | |
| 8,155,384 | B2 | * | 4/2012 | Chew | ................... | G01V 5/0008 |
| | | | | | | 382/104 |
| 9,007,455 | B2 | | 4/2015 | Lee | | |
| 9,160,906 | B2 | | 10/2015 | Bond et al. | | |
| 2004/0071316 | A1 | * | 4/2004 | Stein | ......................... | G01S 5/16 |
| | | | | | | 382/103 |
| 2005/0030418 | A1 | | 2/2005 | Hoffman | | |
| 2005/0111697 | A1 | * | 5/2005 | Yamamoto | ................ | G06T 7/74 |
| | | | | | | 382/103 |
| 2006/0104481 | A1 | * | 5/2006 | Demro | ..................... | G01S 11/12 |
| | | | | | | 382/104 |
| 2007/0221694 | A1 | * | 9/2007 | Aguiliar | .................... | B62J 11/00 |
| | | | | | | 224/420 |
| 2009/0183301 | A1 | * | 7/2009 | Brown | .................... | A42B 3/227 |
| | | | | | | 2/414 |
| 2010/0182423 | A1 | * | 7/2010 | Kawasue | ................ | G01B 11/24 |
| | | | | | | 348/130 |
| 2012/0274770 | A1 | | 11/2012 | Lee | | |

(Continued)

Primary Examiner — Solomon G Bezuayehu
(74) Attorney, Agent, or Firm — Rankin, Hill & Clark LLP (57) ABSTRACT A computer-implemented method for image recording includes receiving images of an environment surrounding a motorcycle from an imaging device disposed in a front section of the motorcycle. The imaging device is directed rearward with respect to the front section of the motorcycle. The method includes detecting a reflected image region in the images. The reflected image region is reflecting off a reflective surface worn by an operator of the motorcycle. The method includes detecting a front object in the environment surrounding the motorcycle based on the reflected image region.

9 Claims, 5 Drawing Sheets (56) References Cited

U.S. PATENT DOCUMENTS

| | | |
|---|---|---|
| 2013/0236063 A1* | 9/2013 | Shin ........................ G08G 1/04 |
| | | 382/105 |
| 2016/0037849 A1* | 2/2016 | Shearman ............ H04N 5/2253 |
| | | 2/424 |
| 2016/0205357 A1 | 7/2016 | Pepito |
| 2017/0103584 A1* | 4/2017 | Vats ........................ G10L 15/22 |
| 2017/0176591 A1* | 6/2017 | Pineda-Deom ...... B60W 40/112 |
| 2017/0176746 A1 | 6/2017 | Weller et al. |
| 2018/0039050 A1* | 2/2018 | Rose .................... H04N 13/189 |
| 2018/0167551 A1* | 6/2018 | Koravadi ........... H04N 5/23206 |
| 2018/0197415 A1* | 7/2018 | Kurata .............. G06K 9/00805 |
| 2019/0025432 A1* | 1/2019 | Mano ..................... G01S 17/89 |

\* cited by examiner

SYSTEM AND METHOD FOR RECORDING IMAGES REFLECTED FROM A VISOR

BACKGROUND

Objects in an environment surrounding a motorcycle can be hazardous to the motorcycle operator, and in some situations, can cause a traffic accident with the motorcycle. Accordingly, situational awareness of these objects and the environment surrounding the motorcycle is desirable for collision mitigation and traffic accident monitoring and/or recording. However, given the varying postures of the motorcycle and the motorcycle operator, and other possible obstructions in a forward view and a rear view of the motorcycle, it can be challenging to capture and detect objects in the environment surrounding the motorcycle. For example, monitoring devices (e.g., cameras) affixed to a front end of the motorcycle in a forward direction can be susceptible to lens flare, obstructions and persistent view changes from undesirable tilting. Additionally, these monitoring devices can be broken during an accident and affect accident monitoring and/or recording.

BRIEF DESCRIPTION

According to one aspect, a computer-implemented method for image recording includes receiving images of an environment surrounding a motorcycle from an imaging device disposed in a front section of the motorcycle. The imaging device is directed rearward with respect to the front section of the motorcycle. The method includes detecting a reflected image region in the images. The reflected image region is reflecting off a reflective surface worn by an operator of the motorcycle. The method includes detecting a front object in the environment surrounding the motorcycle based on the reflected image region.

According to another aspect, a system for image recording includes an imaging device disposed in a front section of a motorcycle. The imaging device being directed rearward with respect to the front section of the motorcycle. The system includes a processor operably connected for computer communication to the imaging device and the motorcycle. The processor receives images of an environment surrounding the motorcycle from the imaging device and detects a reflected image region in the images. The reflected image region is reflecting off a reflective surface worn by an operator of the motorcycle. Further, the processor detects a front object in the environment surrounding the motorcycle based on the reflected image region.

According to a further aspect, a non-transitory computer-readable storage medium including instructions that when executed by a processor, causes the processor to receive images of an environment surrounding a motorcycle from an imaging device disposed in a front section of the motorcycle. The imaging device is directed rearward with respect to the front section of the motorcycle. Further, the processor is caused to detect a reflected image region in the images. The reflected image region is reflecting off a reflective surface worn by an operator of the motorcycle. The processor is also caused to detect a front object in the environment surrounding the motorcycle based on the reflected image region.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

Figure 1A:
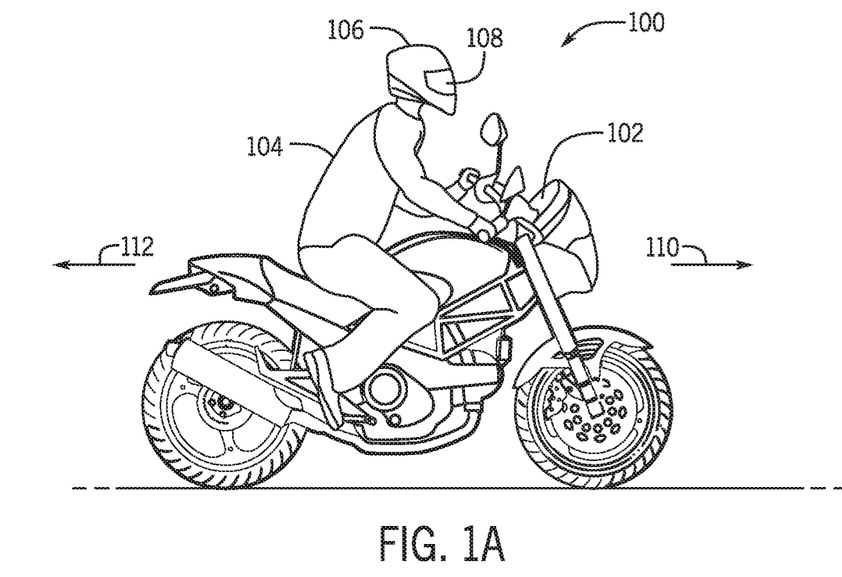
FIG. 1A is side elevation view of a motorcycle and a motorcycle operator according to an exemplary embodiment.

Generally, the systems and methods discussed herein are directed to a system for image recording and object detection. More specifically, the system can capture and record images reflected from a visor (e.g., a head-mounted display) worn by an operator of a motorcycle. Object detection using forward looking image data from reflected images can be performed. Referring now to the drawings, wherein the showings are for purposes of illustrating one or more exemplary embodiments and not for purposes of limiting the same FIG. 1 illustrates a side elevation view 100 including a motorcycle 102 and a motorcycle operator 104. Here, the motorcycle operator is wearing a helmet 106, which can be any type of head-mounted display. The helmet 106 includes a reflective surface 108. The reflective surface 108 can be a lens, a visor, a mirror, or other at least partially reflective surface. As will be described herein, reflected images can be reflected off the reflective surface 108.

The reflective surface 108 is at least partially see-through. Thus, in FIG. 1, the motorcycle operator 104 can have a forward field of view (not shown) projecting through the reflective surface 108, and directed along a forward looking direction 110 from the motorcycle operator 104. The forward looking direction 110 in FIG. 1 is directed along a forward travelling direction of the motorcycle 102, however, in some embodiments, the forward looking direction 110 is not aligned with a forward travelling direction of the motorcycle 102. For example, if the motorcycle operator 104 turns his head to the left or right, the forward looking direction 110 can shift from a forward travelling direction of the motorcycle 102. The forward looking direction 110 is opposite a rearward looking direction 112. The rearward looking direction 112 in FIG. 1 is directed along a reverse travelling direction of the motorcycle 102. However, similar to the forward looking direction 110 discussed above, in some embodiments, the rearward looking direction 112 is not aligned with a rearward travelling direction of the motorcycle 102.

In the position shown in FIG. 1, reflected images reflected off the reflective surface 108 can include an environment surrounding the motorcycle 102 (e.g., objects) in the forward looking direction 110 (i.e., in front of the motorcycle 102). As will be discussed herein, images can be captured along a front facing view of the motorcycle operator 104 including the reflective surface 108. These images can be processed to identify the reflected images reflected from the reflective surface 108 that include objects and other components of an environment surrounding the motorcycle 102 in the forward looking direction 110.

Figure 1B:
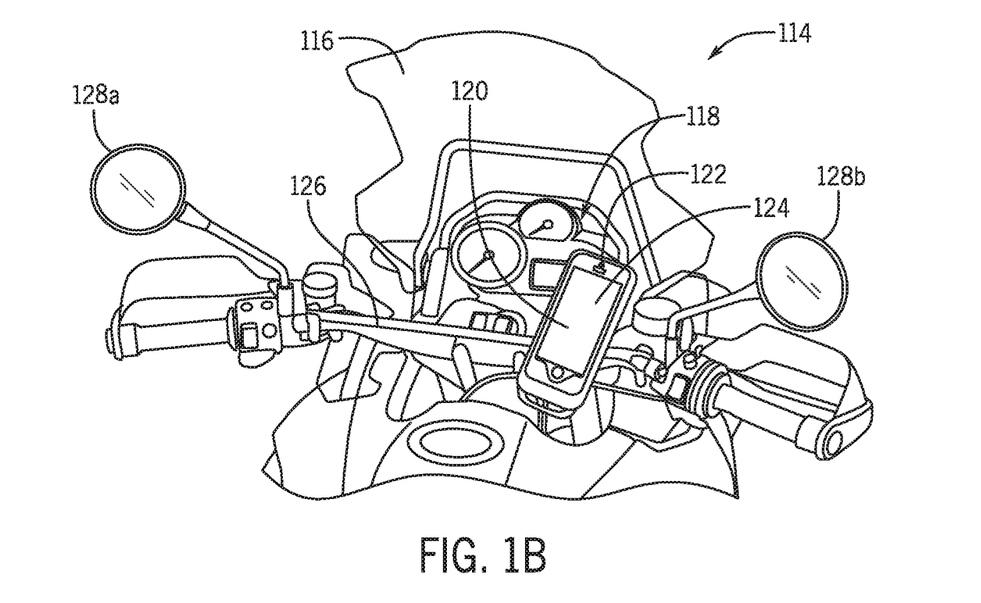
FIG. 1B is an interior view of a front section of the motorcycle of FIG. 1A according to an exemplary embodiment.

Referring now to FIG. 1B, an exemplary view of a front section 114 of the motorcycle 102 is shown. The front section 114 can be referred to as a cockpit of the motorcycle 102 and is positioned in front of the motorcycle operator 104 or a seat (not shown) of the motorcycle 102. The front section 114 can include a windshield assembly 116 and a human machine interface (HMI) 118 with various systems and displays that provide feedback and/or allow the motorcycle operator 104 to interact with the motorcycle 102. In the embodiment shown in FIG. 1B, the windshield assembly 116 is positioned forward (e.g., in the forward looking direction 110) of the HMI 118. In some embodiments, the windshield assembly 116 can be part of the HMI 118 as a heads-up display (HUD).

As shown in FIG. 1B, an imaging device 120 is disposed in the front section 114. More specifically, the imaging device 120 is mounted on a handlebar 126, however, it is understood that the imaging device 120 can be mounted in other areas and/or positions of the front section 114. The front section 114 also includes a left rearview mirror 128a and a right rearview mirror 128b. It is understood that the front section 114 and one or more of the components described herein can have different configurations and designs other than that shown in FIG. 1B.

The imaging device 120 includes an image capture sensor 122, for example, a camera. In this example, the imaging device 120 is a portable device (e.g., a smart phone) and the image capture sensor 122 is a front-facing camera of the portable device. It is understood that in some embodiments, the imaging device 120 is simply an image capture sensor 122 and may not be integrated with another type of device. For example, the imaging device 120 and/or the image capture sensor 122 could be integrated with the motorcycle 102 itself. Further, it is understood that in some embodiments, the imaging device 120 can be a component of the HMI 118. For example, the imaging device 120 includes display 124, which can be used to provide feedback and/or allow the motorcycle operator 104 to interact with the motorcycle 102.

The imaging device 120 and/or the image capture sensor 122 are directed in a reward direction with respect to the front section 114 of the motorcycle 102. Thus, the imaging device 120 and/or the image capture sensor 122 has a field of view (not shown) facing the motorcycle operator 104 in an opposite direction of the forward looking direction 110. In particular, the imaging device 120 and/or the image capture sensor 122 have a field of view that includes the helmet 106 and/or the reflective surface 108. Thus, the imaging device 120 and/or the image capture sensor 122 are able to capture images including the reflective surface 108. The images including the reflective surface 108 show reflective images in the reflective surface 108 of objects in front of the motorcycle 102 (e.g., in the forward looking direction 110). Thus, although the imaging device 120 and/or the image capture sensor 122 are not directed in the forward looking direction 110 (e.g., do not have a field of view in the forward looking direction), the images captured by the imaging device 120 and/or the image capture sensor 122 include image data reflected by the reflective surface 108 about the environment surrounding the motorcycle 102 in the forward looking direction 110.

Figure 2:
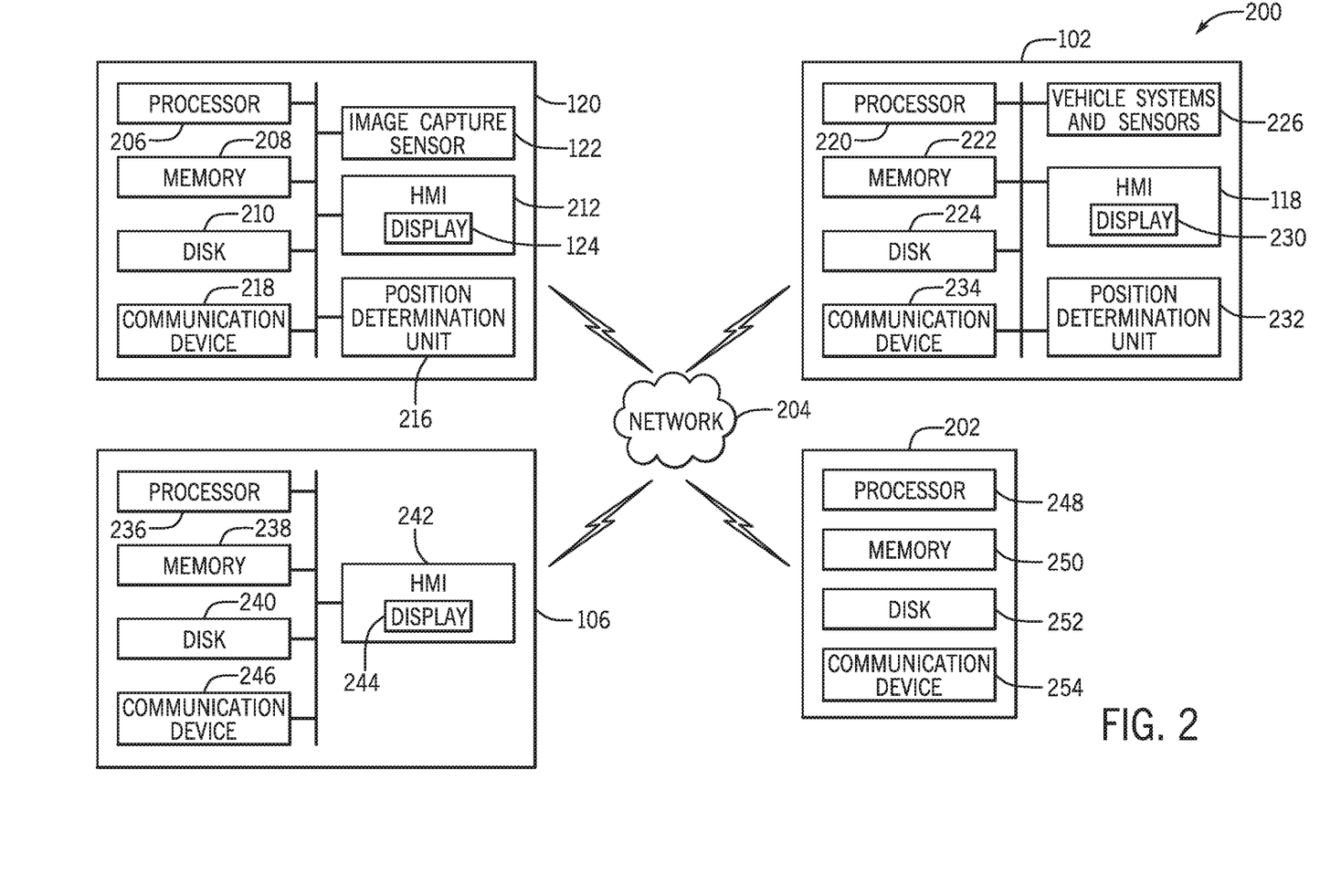
FIG. 2 is a schematic block diagram a system for recording images according to an exemplary embodiment.

The image recording system described herein including the motorcycle 102, the reflective surface 108, and the imaging device 120 will now be described in more detail with FIG. 2. FIG. 2 is an exemplary operating environment 200 for implementing a system for recording images according to an exemplary embodiment, and includes block diagrams of the motorcycle 102, the helmet 106, the imaging device 120, and a remote server 202 each of which are operably connected for computer communication via a network 204, which is a wireless communication network. It is understood that the components shown in FIG. 2, other servers and/or entities (e.g., vehicles, infrastructures) can be operable for computer communication via the network 204, one or more wireless communication protocols including cellular communication, ZigBee, Bluetooth, WiFi, dedicated short range communication (DSRC), and/or any other suitable common or proprietary wireless protocol.

As shown in FIG. 2, the imaging device 120 generally includes, a processor 206, a memory 208, a disk 210, the image capture sensor 122, an HMI 212, the display 124, a position determination unit 216, and a communication device 218, which are each operably connected for computer communication via a bus and/or other wired and wireless technologies. It is understood that although not shown in FIG. 2, one or more of the components of the imaging device 120, can also be implemented with the motorcycle 102, the helmet 106, the remote server 202, and vice versa. Further, it is understood that the motorcycle 102, the helmet 106, the imaging device 120, and the remote server 202 can include other computer components, hardware, and architectures not shown.

Referring again to the imaging device 120 shown in FIG. 2, the processor 206 can include logic circuitry with hardware, firmware, and software architecture frameworks for facilitating image capture, image reporting, image processing, object detection, and object/collision warning as described herein. Thus, in some embodiments, the processor 206 can store application frameworks, kernels, libraries, drivers, application program interfaces, among others, to execute and control hardware and functions discussed herein. In some embodiments, the memory 208 and/or the disk 210 can store similar component as the processor 206 for execution by the processor 206.

The image capture sensor 122 can be any type of image capture sensor and/or device, for example, a charge-coupled device sensor (CCD sensor), a complementary metal-oxide-semiconductor (CMOS), or a hybrid semiconductor imaging technology. The image capture sensor 122 can be high definition capable of high definition imaging or video capture with a wide-angle capture. The image capture sensor 122 can include various calibration and processing functions to capture an image or a video and output a desired image. As mentioned above, the imaging device 120 and/or the image capture sensor 122 is mounted in the front section 114 of the motorcycle 102. As discussed above with FIG. 1B, the image capture sensor 122 is a front-facing camera of the imaging device 120. Thus, the imaging device 120 and/or the image capture sensor 122 are directed in a reward direction with respect to the front section 114 of the motorcycle 102. Said differently, the imaging device 120 and/or the image capture sensor 122 has a field of view (not shown) facing the motorcycle operator 104 in an opposite direction of the forward looking direction 110. In particular, the imaging device 120 and/or the image capture sensor 122 have a field of view that includes the helmet 106 and/or the reflective surface 108. Thus, the imaging device 120 and/or the image capture sensor 122 are able to capture images including the reflective surface 108. The images captured and/or recorded by the imaging device 120 and/or the image capture sensor 122 can be stored (e.g., memory 208, disk 210), processed for object detection, transmitted, and/or displayed. In the embodiments discussed herein, the images are processed to identify objects and can be used to analyze traffic accidents (e.g., to determine a cause of an accident or other accident recording purposes).

Referring again to FIG. 2, the HMI 212 can be used to receive input from the motorcycle operator 104 and/or provide feedback to the motorcycle operator 104. Thus, the HMI 212 can include a display portion and/or an input portion. For example, as discussed above with FIG. 1B, the HMI 212 can include the display 124 (e.g., an output device). The HMI 212 can receive inputs that allow the motorcycle operator 104 to interact or provide input with the motorcycle 102 and/or the imaging device 120 using, for example, gestures, clicks, selections, voice commands. This can be provided with a touch screen, a touch pad, a track pad, hard buttons, soft buttons, and microphone, among others. As mentioned above, the HMI 212, and particularly the display 124, can display information (e.g., graphics, warnings, and notifications). For example, the processor 206 can generate information, suggestions, warnings, and/or alerts and provide the same to the motorcycle operator 104 on the display 124. This information can also be provided in part by the motorcycle 102 and/or the helmet 106 using, for example, data communicated via the network 204 to the imaging device 120. In some embodiments, the display 124 can provide warning information and alerts related to objects detected in the images captured by the image capture sensor 122. The information, warnings, etc., can include, but are not limited to, one or more navigation maps, symbols, icons, graphics, colors, images, photographs, videos, text, audible information, among others. The HMI 212 can also include other systems that provide visual, audible (e.g., speakers), and/or tactile/haptic feedback to the motorcycle operator 104.

The position determination unit 216 can include hardware (e.g., sensors) and software to determine a position and/or orientation of the imaging device 120. More specifically, the position determination unit 216 can determine spatial position data about the imaging device 120, for example, a roll angle, a yaw angle, and a pitch. In one embodiment, the position determination unit 216 includes an inertial measurement unit (IMU). The IMU can include a gyroscope, accelerometer, magnetometers, among others. In other embodiments, the position determination unit 216 can include a global positioning system (GPS) and/or a navigation system that provides a geolocation of the imaging device 120, navigation maps and navigation information.

The communication device 218 can include software and hardware to facilitate data input and output between the components of the imaging device 120 and other components of operating environment 200, for example, the motorcycle 102, the helmet 106, and the remote server 202. Specifically, the communication device 218 can include network interface controllers (not shown) and other hardware and software that manages and/or monitors connections and controls bi-directional data transfer between the communication device 218 and other components via a bus and/or other wired and wireless technologies. For example, as discussed above, the imaging device 120 configured with the communication device 218 can communicate over networks (not shown) with the motorcycle 102, the helmet 106, and/or the remote server 202, other servers and/or entities operable for computer communication over the network 204, other vehicles, and infrastructures via one or more wireless communication protocols including, but not limited to, cellular communication, ZigBee, Bluetooth, WiFi, dedicated short range communication (DSRC), and/or any other suitable common or proprietary wireless protocol.

As shown in FIG. 2, in some embodiments, the motorcycle 102 can include a processor 220, a memory 222, a disk 224 (e.g., a data store), vehicle systems and sensors 226, the HMI 118 including a display 230, a position determination unit 232, and a communication device 234, which are each operably connected for computer communication via a bus and/or other wired and wireless technologies. For purposes of simplicity, like named components of the motorcycle 102 can include the same or similar features and functions as described above with the imaging device 120, and are not discussed in detail herein.

In some embodiments, the vehicle systems and sensors 226 include systems and sensors that provide advanced driver assistance and/or collision mitigation. For example, a collision warning system, a collision mitigation braking system, a blind spot indicator system, a lane keep assist system, among others. The vehicle systems and sensors 226 can include various vehicle sensors that sense and/or measure data internally and/or externally from the motorcycle 102. More specifically, vehicle systems and sensors 226 can include vehicle sensors for sensing and measuring a stimulus (e.g., a signal, a property, a measurement, and a quantity) associated with the motorcycle 102 and/or a particular vehicle system of the motorcycle 102. In some embodiments, the vehicle sensors are for sensing and measuring a stimulus associated with a vehicle and/or an object in proximity to the motorcycle 102, for example, a target vehicle detected in an environment surrounding the motorcycle 102. For example, the vehicle systems and sensors 226 can include RADAR and/or LIDAR sensors that measure distance (e.g., lateral, longitudinal) and speed of objects surrounding the motorcycle 102.

As mentioned above with FIG. 1B, the motorcycle 102 can also include the HMI 118 and the display 230, with the similar and/or same functions as discussed above with the HMI 212 and the display 124 of the imaging device 120. In some embodiments, the imaging device 120 can extend the functionalities of the HMI 118 and/or the display 230 to the imaging device 120 and vice versa using for example a communication link (not shown). Thus, for example, the imaging device 120 can provide (e.g., via the display 124) information, applications, and/or interfaces that originate from the motorcycle 102 and the HMI 118. Similarly, in some embodiments, the HMI 118 can provide information, applications, and/or interfaces that originate from the imaging device 120.

In some embodiments, the display 230 can be integrated with the windshield assembly 116 of the motorcycle 102, for example, as a heads-up display. The display 230 can also be integrated with a display panel and/or an instrument cluster. In some embodiments, the HMI 118 can include other systems and components of the motorcycle 102 that provide visual, audible, and/or tactile/haptic feedback to the motorcycle operator 104.

As shown in FIG. 2, in some embodiments, the helmet 106 can include a processor 236, a memory 238, a disk 240 (e.g., a data store), and HMI 242 including a display 244, and a communication device 246, which are each operably connected for computer communication via a bus and/or other wired and wireless technologies. For purposes of simplicity, like named components of the motorcycle 102 can include the same or similar features and functions as described above with the motorcycle 102 and/or the imaging device 120, and are not discussed in detail herein. As discussed above, in some embodiments, the HMI 242 and/or the display 244 can include a heads-up display. Thus, similar to the HMI 118 and the HMI 212, the HMI 242 can provide information, applications, and/or interfaces that originate from the motorcycle 102, the imaging device 120, and vice versa.

FIG. 2 also includes the remote server 202, which can be, for example, a service provider, and can include a processor 248, a memory 250, a disk 252 (e.g., a data store), and a communication device 254. In some embodiments, the motorcycle 102, the helmet 106 and/or, the imaging device 120 can transmit and receive information directly or indirectly to and from the remote server 202 using, for example, the network 204.

Figure 3:
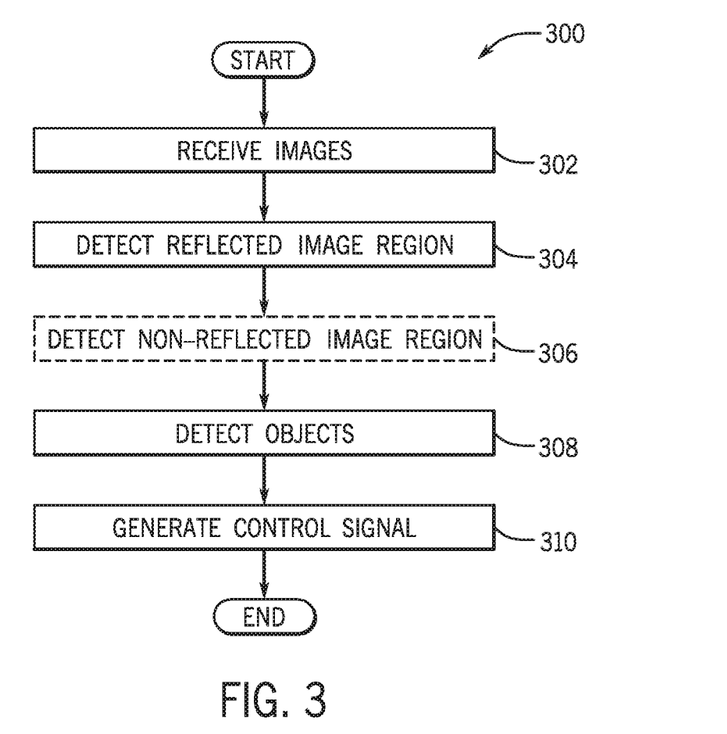
FIG. 3 is a process flow diagram of a method for recording images according to an exemplary embodiment.

The above systems and components will now be described with reference to FIG. 3, which illustrates a method 300 for recording images according to an exemplary embodiment. Thus, FIG. 3 will be described with reference to the components of FIGS. 1A, 1B, and 2. At block 302, the method 300 includes receiving images. More specifically, the processor 206 receives images of an environment surrounding the motorcycle 102 from the imaging device 120. As shown above with FIG. 1B, the imaging device 120 and/or the image capture sensor 122 are disposed in the front section 114 of the motorcycle 102. The imaging device 120 and/or the image capture sensor 122 is directed rearward with respect to the front section 114 of the motorcycle 102.

In some embodiments, the images received at block 302 can be performed continuously, for example, while the motorcycle 102 is in an ON state. In other embodiments, the imaging device 120 and/or the image capture sensor 122 can be activated to turn ON and record images based on a trigger event. For example, if the vehicle systems and sensor 226 detect objects in proximity to the motorcycle 102 and/or detects an impending accident, the motorcycle 102 can communicate a control signal to the imaging device 120 to begin image capture. It is understood that other types of trigger events for starting and stopping image capture, image recording, and image storage can be implemented.

As discussed above with FIGS. 1B and 2, in one embodiment, the imaging device 120 in a portable device and the image capture sensor 122 is a forward-facing camera integrated with the portable device. Thus, the imaging device 120 and/or the image capture sensor 122 has a field of view (not shown) facing the motorcycle operator 104 in an opposite direction of the forward looking direction 110. In particular, the imaging device 120 and/or the image capture sensor 122 have a field of view that includes the helmet 106 and/or the reflective surface 108. Thus, the imaging device 120 and/or the image capture sensor 122 are able to capture images including the reflective surface 108.

Figure 4A:
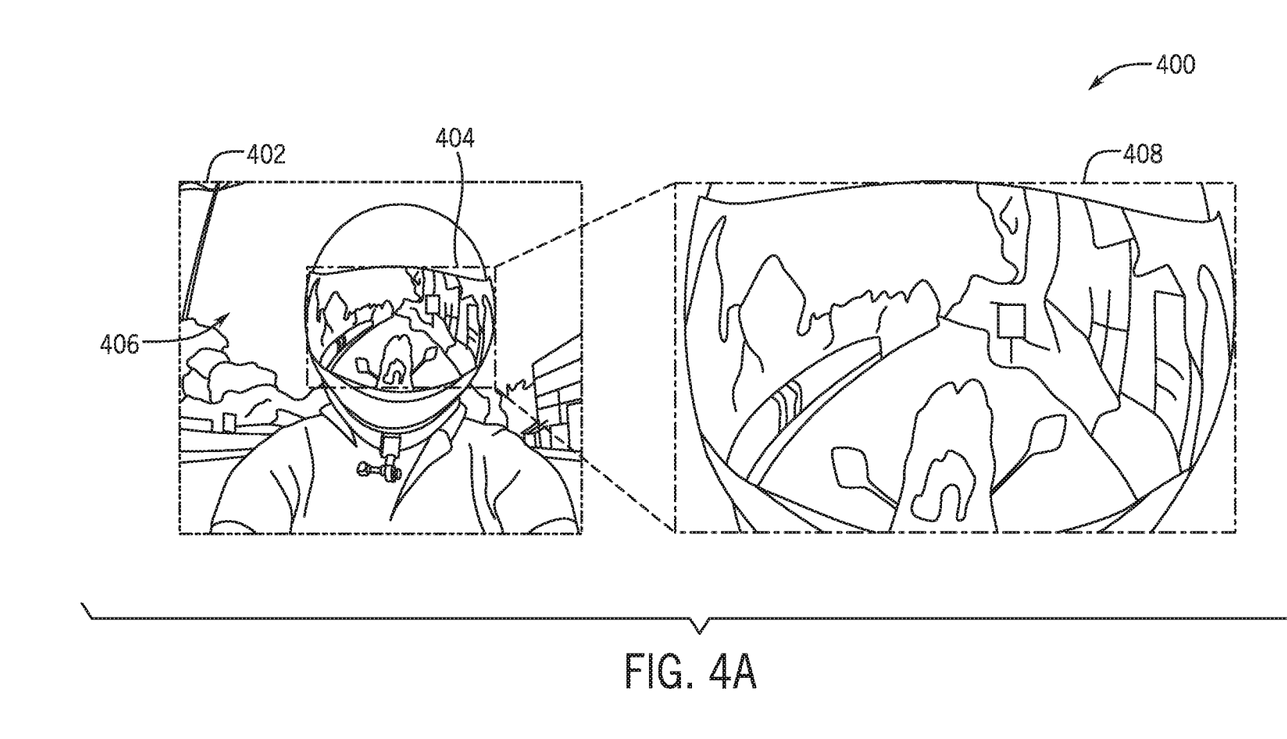
FIG. 4A illustrates an exemplary image and a reflected image according to an exemplary embodiment.

Referring now to FIG. 4A, a schematic view 400 of an exemplary image 402 captured by the imaging device 120 and/or the image capture sensor 122 will be described. As shown in FIG. 4A, the image 402 is a result of the positioning of the imaging device 120 and/or the image capture sensor 122, namely, directed rearward with respect to the front section 114 of the motorcycle 102. The field of view (not shown) of the imaging device 120 and/or the image capture sensor 122 in a front-facing manner allows for capture of the image 402 including the head and upper torso of the motorcycle operator 104 as well as a scene behind the motorcycle operator 104. Thus, the image 402 captures the helmet 106 and the reflective surface 108 of the helmet 106.

Accordingly, at block 304, the method 300 includes detecting a reflected image region. More specifically, the processor 206 can detect a reflected image region in the images. As mentioned above with FIG. 4A, the image 402 captures the helmet 106 and the reflective surface 108 of the helmet 106. Accordingly, in FIG. 4A, a reflected image region 404 is detected in the image 402 as reflecting off the reflective surface 108 worn by the motorcycle operator 104. The reflected image region 404 is shown in more detail in the close-up view 408. The reflected image region includes forward looking image data extending forward of the motorcycle 102 (e.g., in a forward looking direction 110). For example, with reference to the close-up view 408, the reflected image region 404 shows forward looking image data including the cockpit of the motorcycle 144 and an environment surrounding the motorcycle 102 in front of the motorcycle 102.

As discussed above, the field of view (not shown) of the imaging device 120 and/or the image capture sensor 122 in a front-facing manner allows for capture of the image 402 including the head and upper torso of the motorcycle operator 104 as well as a scene behind the motorcycle operator 104. Regions of the image 402 that do not include reflective surfaces can be considered real-image regions or non-reflected image regions. For example, as shown in FIG. 4A, the image 402 includes the reflected image region 404 and a non-reflected image region 406. Accordingly, the method 300 can include at block 306, detecting the non-reflected image region 406. In some embodiments, the non-reflected image region includes a scene reward (or behind) the motorcycle operator 104. For example, in FIG. 4A, the non-reflected image region 406 includes rearward looking image data extending reward of the motorcycle 102 (e.g., in a rearward looking direction 112). It is understood that the non-reflected image region 406 can also include other real-image data, for example, in FIG. 4A, the torso of the motorcycle operator 104 and the helmet 106 not including the reflective surface 108.

Figure 4B:
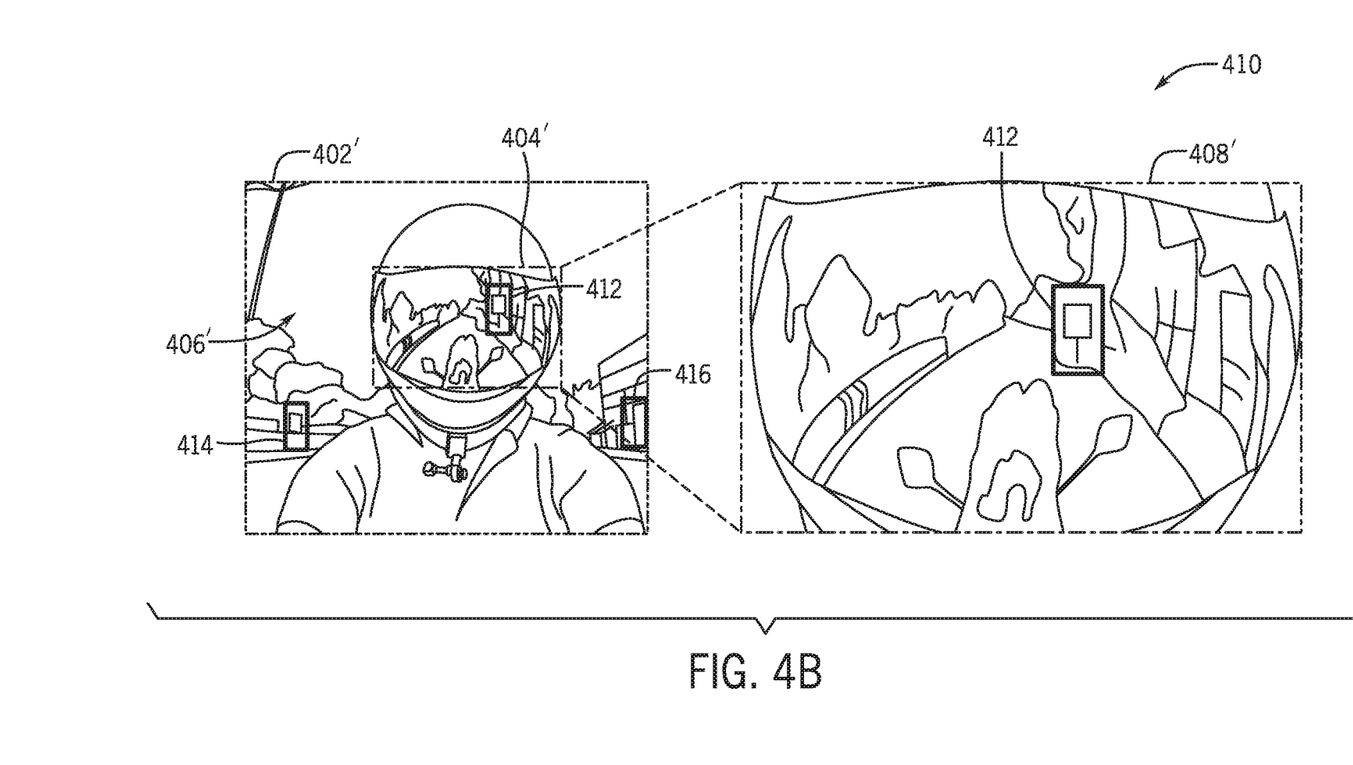
FIG. 4B illustrates exemplary object detection in the image and reflected image of FIG. 4A according to an exemplary embodiment.

At block 308, the method 300 includes detecting one or more objects. For example, the processor 206 using image processing and object detection techniques can process the images received at block 302 and the regions detected at blocks 304 and 306 to detect objects in the environment surrounding the motorcycle 102. More specifically, the processor 206 can detect a front object in the environment surrounding the motorcycle 102 based on the reflected image region 404. For example, FIG. 4B illustrates an image 402' which shows object detection within the image 402 of FIG. 4A. As shown in FIG. 4B, an objected is detected as indicated by a bounding box 412 in the reflected image region 404'. The reflected image region 404' is shown in more detail in the close-up view of 408'. Accordingly, the processor 206 has detected an object shown by the bounding box 412 in the environment surrounding the motorcycle 102 based on the reflected image region 404'. The bounding box 412 is an object in a forward looking view of the motorcycle 102. Specifically, the bounding box 412 is drawn around a traffic indicator positioned in front of the motorcycle 102 and to the side of a road the motorcycle 102 is travelling along.

In one embodiment, the processor 206 can detect a rear object in the environment surrounding the motorcycle 102 based on the non-reflected image region 406. Thus, as shown in FIG. 4B, a bounding box 414 and a bounding box 418 indicate objects detected in the non-reflected image region 406'. The objects indicated by the bounding box 414 and the bounding box 416 are positioned behind the motorcycle 102 and the motorcycle operator 104 in an environment surrounding the rear of the motorcycle 102 (e.g., in a rearward looking direction 112).

At block 310, the method 300 includes generating a control signal. More specifically, at block 310, control of the motorcycle 102, the helmet 106, and/or the imaging device 120 can be implemented based on the object detection described above. For example, the processor 206 can generate a control signal based on the front object (e.g., indicated by bounding box 412) to provide an indicator capable of being sensed by the motorcycle operator 104. For examples, a warning or notification could be provided to the HMI 118, HMI 212, and/or the HMI 242. Thus, as an illustrative example, a warning can be provided via the display 124 of the imaging device 120 to warn the motorcycle operator 104 about an object in proximity to the motorcycle 102. In other embodiments, the processor 206 can generate a control signal based on the front object (e.g., indicated by bounding box 412) and the rear object (e.g., indicated by the bounding box 414 and the bounding box 416) to provide an indicator to the motorcycle operator 104.

As mentioned above, the indicator can be provided to one or more devices shown in the operating environment 200. For example, the processor 260 can control the helmet 106 (e.g., the display 244) to provide an indicator to the motorcycle operator 104 based on the front object. A collision mitigation system (e.g., the vehicle systems and sensors 226) could be controlled based on the object detection. The information about the objects could also be transmitted to the remote server 202 to be stored for image processing or navigation purposes. It is understood that other types of control and/or communication of the object detection can be implemented.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for image recording an environment surrounding a motorcycle and an operator of the motorcycle, comprising:

positioning an imaging device in a front section of the motorcycle forward the operator, directed towards a rear section of the motorcycle rearward the operator and opposite a forward travelling direction of the motorcycle, so that the imaging device has a field of view including a reflective surface worn by the operator; receiving images from the imaging device;

detecting in the images a reflected image region reflecting off the reflective surface worn by the operator, wherein the reflected image region is forward looking image data extending forward of the motorcycle;

detecting in the images a non-reflected image region, wherein the non-reflected image region is rearward looking image data extending rearward of the motorcycle;

detecting a front object in the reflected image region, wherein the front object is located forward the motorcycle;

detecting a rear object in the non-reflected image region, wherein the rear object is located rearward of the motorcycle; and generating a control signal based on the front object and the rear object to provide an indicator capable of being sensed by the operator.

2. The computer-implemented method of claim 1, wherein the imaging device is a forward facing camera integrated with a portable device.

3. The computer-implemented method of claim 1, wherein the reflective surface is attached to a head-mounted display worn by the operator.

4. A system for image recording, comprising:

a motorcycle having a front section forward an operator and towards a forward travelling direction of the motorcycle and a rear section rearward the operator and towards a reverse travelling direction of the motorcycle;

an imaging device disposed in the front section of the motorcycle forward the operator, and directed towards the rear section of the motorcycle rearward the operator and towards the reverse travelling direction of the motorcycle, so that the imaging device has a field of view including a reflective surface worn by the operator; and a processor operably connected for computer communication to the imaging device and the motorcycle, wherein the processor:

receives the images from the imaging device;

detects a reflected image region in the images, wherein the reflected image region is a reflected image in the images reflecting off the reflective surface worn by the operator of the motorcycle, wherein the reflected image region is a representation of forward looking image data extending forward of the motorcycle;

detects a non-reflected image region in the images, wherein the non-reflected image region is rearward looking image data extending rearward of the motorcycle;

detects a front object in the reflected image region, wherein the front object is located forward the motorcycle;

detects a rear object in the non-reflected image region of the image, wherein the rear object is located rearward of the motorcycle; and generates a control signal based on the front object and the rear object to provide an indicator capable of being sensed by the operator.

5. The system of claim 4, wherein the imaging device is integrated with a portable device, and the portable device is mounted in a handlebar disposed in the front section of the motorcycle.

6. The system of claim 4, wherein the reflective surface is attached to a head-mounted display worn by the operator, and the processor is operatively connected for computer communication to the head-mounted display.

7. The system of claim 6, wherein the processor controls the head-mounted display to provide the indicator to the operator based on the front object.

8. A non-transitory computer-readable storage medium including instructions that when executed by a processor, causes the processor to:

receive images of an environment surrounding a motorcycle from an imaging device, wherein the imaging device is positioned in a front section of the motorcycle forward an operator and directed towards a rear section of the motorcycle rearward the operator and opposite a forward travelling direction of the motorcycle, so that the imaging device has a field of view including a reflective surface worn by the operator;

detect a reflected image region in the images, wherein the reflected image region is a reflected image in the images that is reflecting off the reflective surface and the reflected image region is forward looking image data extending forward of the motorcycle;

detect a non-reflected image region in the images, wherein the non-reflected image region is rearward looking image data extending rearward of the motorcycle;

detect a front object in the reflected image region, wherein the front object is located forward the motorcycle;

detect a rear object in the non-reflected image region, wherein the rear object is located rearward of the motorcycle; and generate a control signal based on the front object and the rear object to provide an indicator capable of being sensed by the operator.

9. The non-transitory computer-readable storage medium of claim 8, wherein the reflective surface is a visor attached to a head-mounted display.

\* \* \* \* \*